United States Patent [19]
Cho et al.

[11] Patent Number: 5,301,774
[45] Date of Patent: Apr. 12, 1994

[54] BRAKE SPIDER ASSEMBLY

[75] Inventors: Sung J. Cho, Rochester Hills; Klaus H. Pump, Mt. Clemens, both of Mich.

[73] Assignee: Fruehauf Trailer Corporation, Southfield, Mich.

[21] Appl. No.: 801,020

[22] Filed: Dec. 2, 1991

Related U.S. Application Data

[63] Continuation-in-part of Ser. No. 543,537, Jun. 26, 1990, abandoned.

[51] Int. Cl.⁵ .............................................. F16D 65/09
[52] U.S. Cl. .................................. 188/206 A; 164/98
[58] Field of Search ...................... 164/98, 111; 188/78, 188/205 R, 206 A, 325, 330

[56] References Cited

U.S. PATENT DOCUMENTS

| | | | |
|---|---|---|---|
| 1,895,533 | 1/1933 | Bagley | 164/111 |
| 3,216,105 | 11/1965 | Gollwitzer | 164/111 X |
| 3,385,405 | 5/1968 | Cullen | 188/206 A |
| 4,452,347 | 6/1984 | Dozier | 188/330 |
| 4,854,427 | 8/1989 | Baroni | 188/205 R |
| 4,858,730 | 8/1989 | Baroni | 188/205 R |

FOREIGN PATENT DOCUMENTS

| | | | |
|---|---|---|---|
| 368368 | 5/1990 | European Pat. Off. | 188/325 |
| 132363 | 8/1983 | Japan | 164/98 |
| 232662 | 12/1984 | Japan | 164/111 |
| 11062 | 1/1989 | Japan | 164/98 |

Primary Examiner—Robert J. Oberleitner
Assistant Examiner—Alfred Muratori
Attorney, Agent, or Firm—Willian Brinks Hofer Gilson & Lione

[57] ABSTRACT

A brake spider for a braking system on over the road trailers. The brake spider is to be welded to a tubular axle of the vehicle and is of composite construction. An inner annular member is formed from a pair of rolled, semi-circular steel plates which are joined end to end to form a circular hub. An outer member is cast from ductile cast iron. The inner member includes apertures disposed about the circumference and extend through the hub such that the cast iron fills the apertures and mechanically interlocks the two members together as a composite of cast iron and steel. Because the inner hub portion is steel, it can readily be welded to the vehicle axle. A method of casting the spider of this construction is disclosed including an alternative which uses hollow tubular steel, pierced to form apertures, and sliced to provide the circular inner member. The circular member is used to core the casting mold into which molten ductile cast iron is cast against the inner member and into the apertures to interlock the members as a composite.

20 Claims, 5 Drawing Sheets

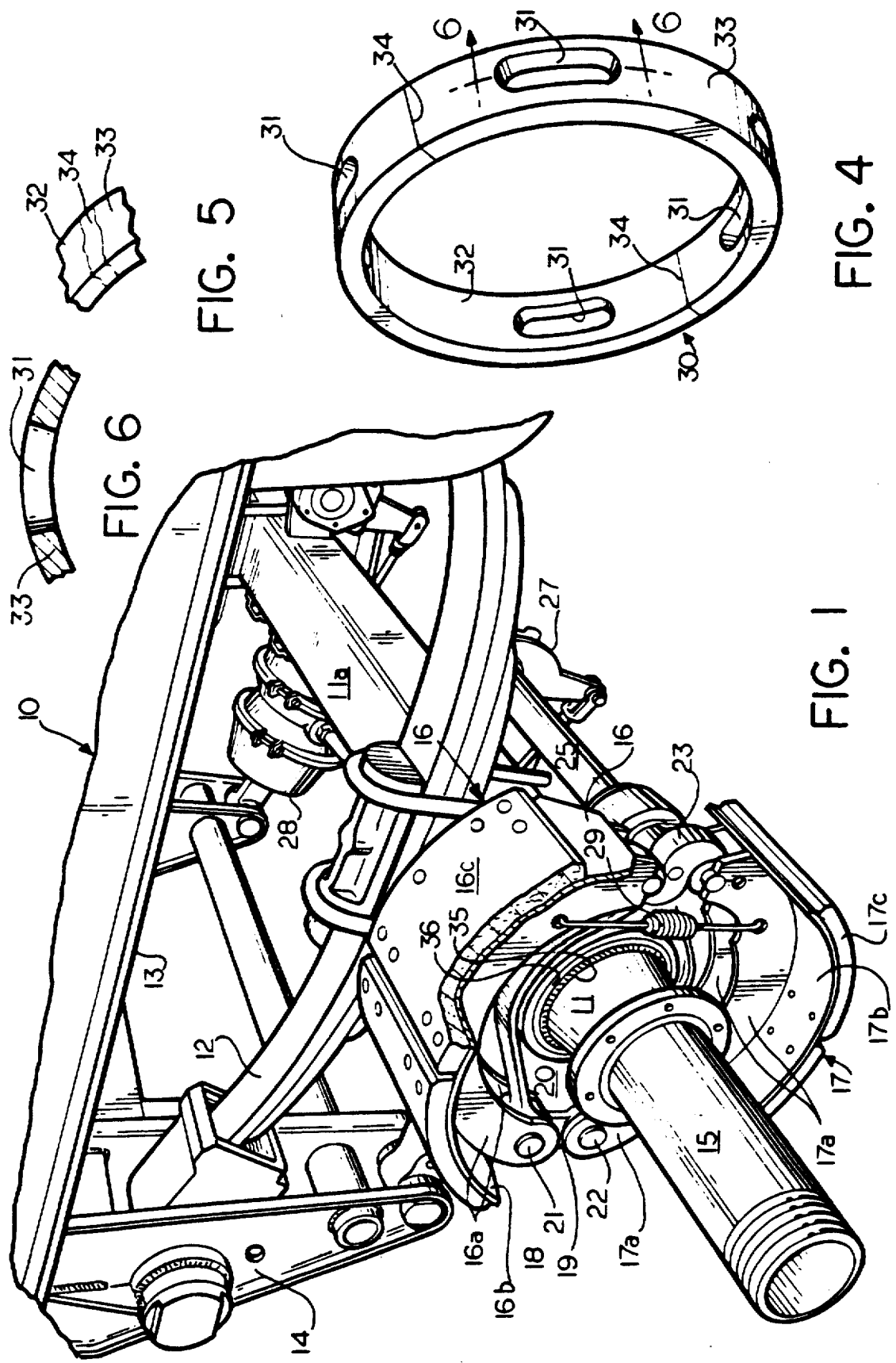

BRAKE SPIDER ASSEMBLY

CROSS-REFERENCE TO RELATION APPLICATION

This application is a continuation-in-part of copending U.S. patent application Ser. No. 07/543,537 filed Jun. 26, 1990 now abandoned.

The present invention relates to a spider for a drum brake, and more specifically to a drum brake used with truck and trailer axle configurations.

BACKGROUND OF THE INVENTION

Spiders for brake assemblies of the foregoing type have been produced of weldable steel and formed by forging, stamping, casting or the like. The spider in its use on the brake assembly is welded to a stationery axle spindle of the vehicle on which the brake assembly is being utilized. The spider is elongated and serves as the foundation of the brake assembly. Even though the spider is not a moving part of the brake assembly, it is subject to and must withstand substantial stress under dynamic braking conditions. Also, the spider is subjected to substantial twisting forces as it transfers braking torque to the axle during braking.

The spider has heretofore traditionally been formed of steel as heavy cast or forged members with certain appropriate areas machined and bored to accommodate the brake assembly parts, such as the anchor pins and actuating camshaft, and for mounting the spider to the axle. The mounting is fixed by welding a hub of the spider on the axle. In heavy duty installations as in the case of trucks, truck trailers, and the like, the spider is a heavy duty, often massive and expensive part.

Several attempts in the prior art have been made to produce lighter weight spiders. U.S. Pat. Nos. 3,385,405 and 4,452,347 disclose the use of two plates secured together, and U.S. Pat. Nos. 4,200,174 and 4,337,851 disclose the use of a stamped brake spider U.S. Pat. No. 4,445,597 employs a stamped, sheet metal body part and a forged anchor pin piece. The patent coincidentally mentions a spider element comprised of a unitary casting or the like, of a weldable steel so as to provide for attachment to the vehicle axle by welding Traditionally, the brake spider of the type set forth in the prior art is made from readily weldable steel alloys.

SUMMARY OF THE INVENTION

Under the present invention, it is a primary object to provide a composite brake spider for use in braking systems for over the road truck trailers and the like, and a method of making same in which the brake spider is comprised of an inner annular member formed of steel and an outer member formed from ductile cast iron mechanically interlocked to the inner annular member.

In the method of producing the brake spider according to a first embodiment this invention, the inner annular member is comprised of a pair of semi-circular steel plates that are made from flat steel plates that are punched to form one or more apertures and then worked into semi-circular shape. Two of the semi-circular members are preferably welded together to form the annular hub portion of the spider. The hub is appropriately placed in a mold as a cylindrical core wherein ductile cast iron is molded around the hub, and the two integrally joined by the cast iron filling the plural apertures of the circular hub. The molten ductile cast iron is cast against the inner annular member and allowed to cool and harden to form a securely mechanically interlocked composite construction of the two. This composite is weldable onto the steel axle of the vehicle, continuously around the circumference of the annular hub if desired or required, by reason of the steel hub being weldable directly to the axle, as in the usual method of fixing the spider on the axle.

Accordingly, it is an object of the invention to provide a brake spider that is more economical to manufacture and of excellent quality. More particularly, it is an object, of the present invention to provide a composite brake spider in which the composite, for most of its mass, incorporates a less expensive material that is poured to shape eliminating losses of material that are typical in piercing and stamping the shape of the part.

Other advantages and aspects of the invention shall become readily apparent to those skilled in the art upon reference to the accompanying drawings and the description of a preferred embodiment hereinafter set forth.

BRIEF DESCRIPTION OF THE DRAWINGS

FIG. 1 is a perspective view of a brake assembly mounted on the axle of an over the road truck trailer;

FIG. 4 is a perspective view of the annular inner member of the brake spider of FIG. 2 having plural formed apertures therethrough disposed about the circumference;

FIG. 5 is a fragmentary view of the member of FIG. 4 showing the weld on a diameter of the annular member in joining two semi-circular, punched and rolled bars of steel to form the circular member;

FIG. 6 is a sectional view taken along line 6—6 of FIG. 4;

DETAILED DESCRIPTION OF THE INVENTION

Figure 3:
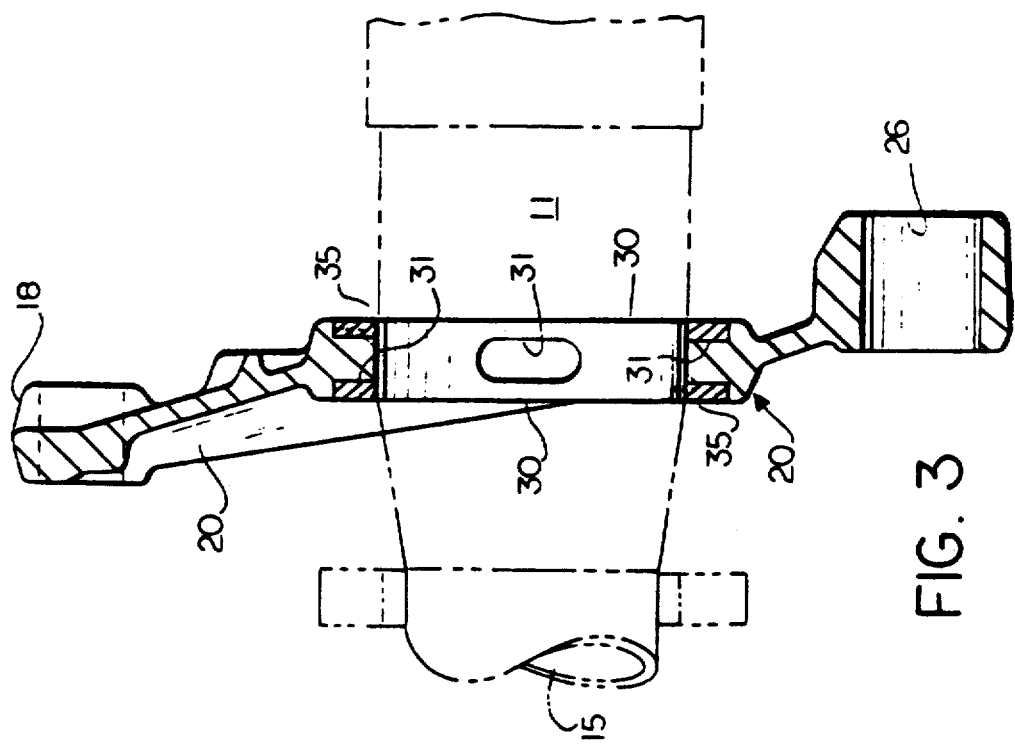
FIG. 3 is a sectional view taken along line 3—3 on FIG. 2.
Figure 2:
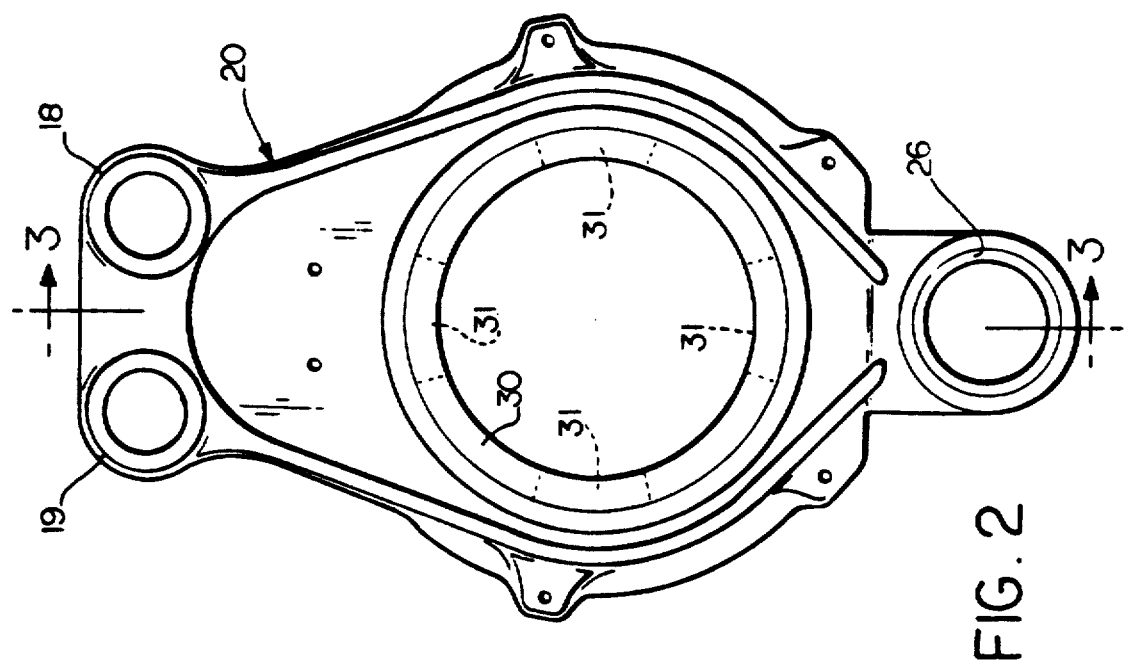
FIG. 2 is a top plan view of the composite brake spider of an embodiment of the present invention.

Referring to FIGS. 1-3, an over the road truck trailer 10 is supported on transverse axles, such as the axle 11, integrally connected with a transverse frame member 11a through leaf springs 12 that are connected to a bed 13 of the trailer 10 by mounting brackets 14. A wheel is mounted on bearings (not shown) that fit on the outer end 15 of the tubular axle 11 and the wheel includes a brake drum (not shown) that circumscribes the upper and lower brake shoes 16 and 17. The brake shoes 16 and 17 each include a pair of spaced flanges 16a and 17a which straddle, with a slight clearance, the anchor pin bosses 18 and 19, respectively, of a spider 20. The flanges 16a and 17a of each brake shoe pivotally engage the opposite projecting ends of the anchor pins 21 and 22. Each of the brake shoes 16 and 17 is constructed in conventional fashion and includes a semi-circular brake shoe table 16b and 17b upon which the brake linings 16c and 17c are attached, such as by rivets.

The opposite ends of the pairs of flanges 16a and 17a have bearing surfaces which seat upon the ends of a cam 23 fixed on the end of an actuating camshaft 25. The camshaft 25 is journalled in a boss portion 26 (FIG. 2) and is provided in a conventional manner with an actuating lever mechanism 27 extending radially from the shaft and connected to an air-operated mechanism 28 of an air brake system. Return springs 29 (but one is shown on FIG. 1) are connected between the brake shoe flanges 16a and 17a which maintains each of their end rollers in a seated contact upon the surface of the cam 23. When the air-operated mechanism 28 is energized, a lever 27 rotates the camshaft 25 in a clockwise direction (FIG. 1) and the cam 23 rocks the brake shoes 16c, 17c outwardly together against the brake drum on the wheel.

This brake system, as just described, is for the most part conventional and should need no further detailed description of its operation. According to this invention, the spider 20 and its fixed mounting on the axle 11 of the vehicle are of special construction as will hereinafter appear.

The spider 20 shown on FIGS. 2 and 3 is cast in a mold. In casting the spider 20, a circular hub 30 is formed of steel that is weldable material. A preferred method of making the hub 30 is as follows. A pair of strips of the rolled steel material, for example, SAE 1030 steel, are first formed to length and punched to form elongated apertures 31. Each of the strips is then rolled to a semi-circular shape as matching elements 32 and 33. The punched apertures 31, after the strips are rolled to semi-circular shape, have tapered sides The bars as they are rolled have the end walls of the apertures 31 taper toward the inner diameter, as is shown on FIG. 4. (The larger area of opening of the aperture is placed facing outwardly of the circular hub.) The semi-circular elements 32 and 33 are placed end to end and welded to each other at a weld line 34 (see FIG. 5); thereby, the circular hub 30 is formed having four equally spaced apertures 31 around the circumference. The circular hub 30 is sized in its ID to fit over axle 11 of the vehicle.

The circular hub 30 is placed as a core in the mold for the spider part and ductile cast iron is poured to mold the part against the hub 30. The cast iron flows into the plural apertures 31 uniting the cast iron portion of the spider 20 with the steel hub insert. The two parts comprised of the circular inner member and the cast iron outer member are securely mechanically interlocked to form the composite brake spider 20.

The spider 20 is mounted on the tubular axle 11 and is welded in place at an annular weld 35 in a position for mounting the flanges 16a, 16b of the brake shoes 16, 17 and mechanism just described for mounting the brake. The weld 35 is applied on both sides of the spider 20 and preferably extends continuously therearound.

An alternative method of making the circular hub 30 is by making a steel hollow tube of the desired wall thickness. The tube is placed in a fixture and the apertures 31 are punched to the configuration shown on FIG. 4. Bands are cut from the punched tube with the apertures disposed in spaced array about the circumference to form the circular hub 30. In casting the spider 20, this form of hub is placed in the mold as a core and the ductile cast iron poured to fill the mold in the manner described earlier herein.

The composite brake spider according to the embodiment of FIGS. 1-6 is more economical to manufacture, its cost being on the order of seventy-five percent of the cost of present day stamped steel brake spiders.

Figure 7:
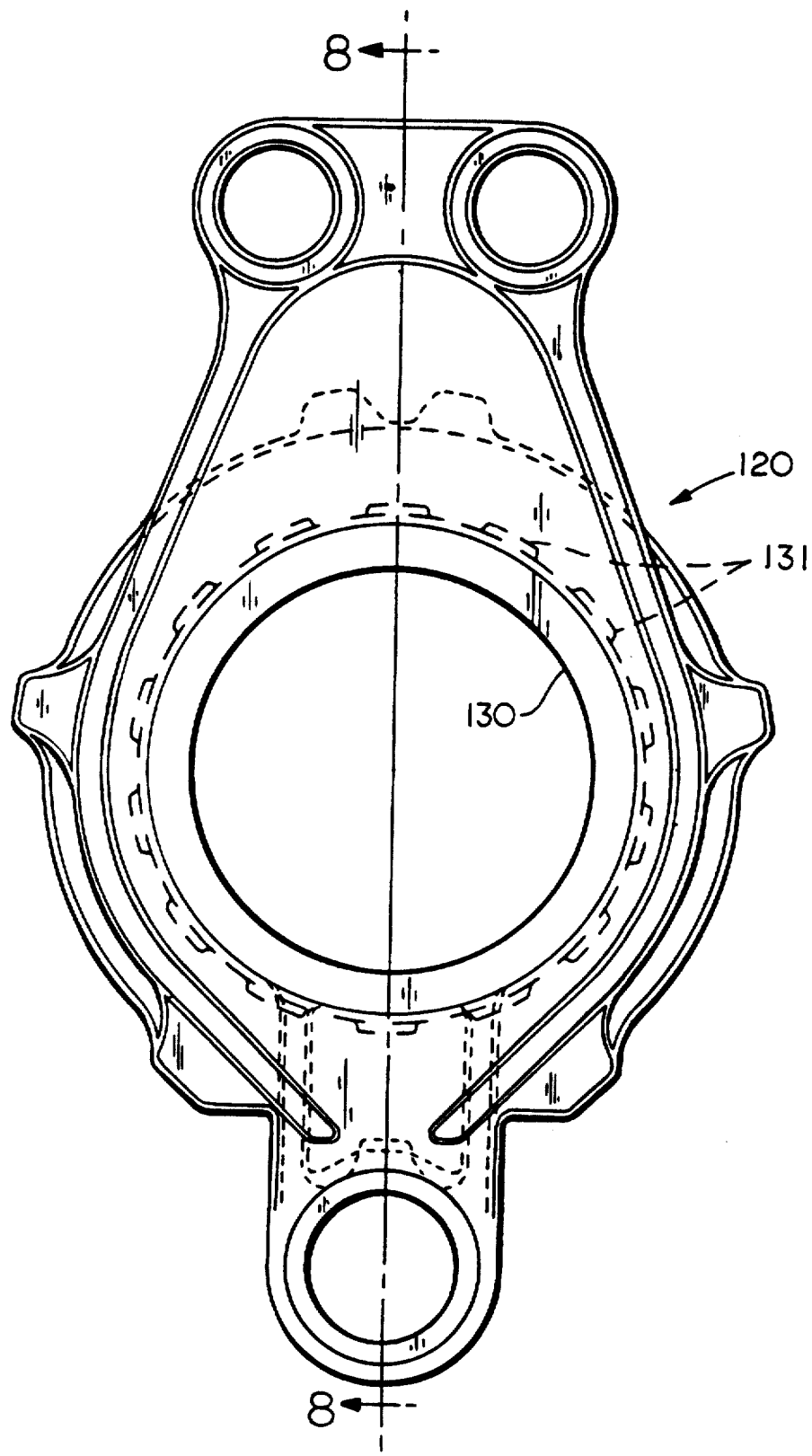
FIG. 7 is a view similar to FIG. 2 of an alternative embodiment of the present invention.
Figure 8:
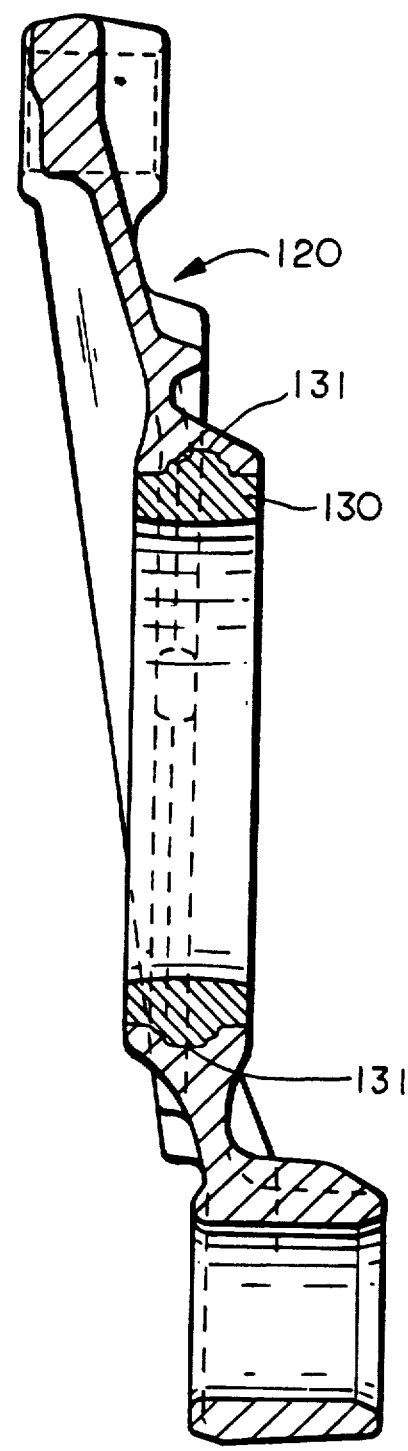
FIG. 8 is a sectional view taken on line 8—8 of FIG. 7.
Figure 9:
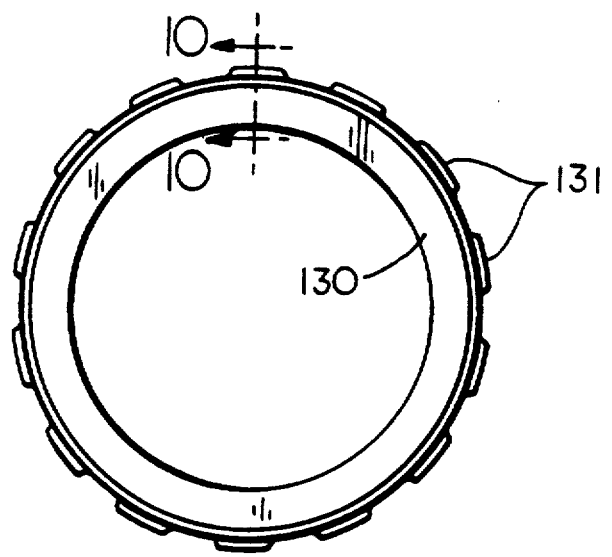
FIG. 9 is a plan view of an element of the brake spider of FIG. 7.
Figure 10:
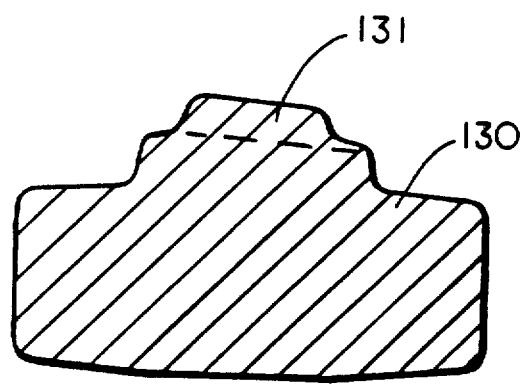
FIG. 10 is a view taken on line 10—10 of FIG. 9.

FIGS. 7-9 illustrate an alternative embodiment of a spider 120 which is cast around a one-piece, seamless, forged steel, annular hub 130. The hub is placed as a core in a mold and ductile cast iron is poured to mold the spider against the hub. Mechanical interlocking of the spider 120 to the hub 130 is necessary because cast iron will not chemically bond to forged steel, and is obtained by providing an outer circumference of the hub with a circumferential series of spaced apart, radially outwardly projecting ribs 131. The hub 130 is preferably imperforate, to avoid excess chilling of the molten cast iron which will occur if molten cast iron is poured against a cold surface, especially one with an unduly large surface to mass ratio such as a surface with deep openings extending therethrough. This phenomenon can lead to the formation of localized stress concentrations in the cast iron portion of the spider 120. Such stress concentrations, in turn, can lead to the formation of cracks and premature failure of the composite spider. Thus, the composite brake spider of FIGS. 7-9, though somewhat more expensive to produce than that of FIGS. 2-6, is still substantially less expensive to produce than a conventional forged steel brake spider, and is more immune to the formation of stress concentration therein than the spider of FIGS. 2-6.

Preferred embodiments of the present invention have been shown and described herein, and it will be appreciated that other embodiments, modifications and variants are possible, and all such apparent embodiments, modifications and variants are to be regarded as being within the spirit and scope of the present invention.

What is claimed is:

1. A composite brake spider adapted for welding attachment to a steel axle component on a vehicle comprising:
    an annular inner member formed of steel and including at least one radially extending surface irregularity in said inner member, and
    an outer member encircling said inner member and formed of ductile cast iron, said outer member being formed in intimate contact around said inner member and physically interlocked to said surface irregularity in said inner member.

2. The composite brake spider of claim 1 in which said annular inner member is a one-piece, seamless forging, and wherein said at least one radially extending surface irregularity in a radially outwardly projecting rib on an outer surface of said forging.

3. The composite brake spider of claim 2 wherein said one-piece seamless forging includes a plurality of circumferentially spaced apart outwardly projecting ribs.

4. The composite brake spider of claim 3 in which said annular member includes a plurality of circumferentially spaced apart elongated apertures extending through said inner member.

5. The composite brake spider of claim 4 in which said circular hub is comprised of a pair of rolled, semi-circular steel plates joined end to end by welding.

6. The composite brake spider of claim 4 in which said circular hub is comprised of SAE 1030 steel.

7. The composite brake spider of claim 4 wherein said plurality of apertures includes four apertures.

8. The composite brake spider of claim 4 wherein each of said apertures has a wall with opposed ends, and wherein the walls of the ends of each of said apertures tapers radially inwardly of the circular hub, the cast iron of the said outer member filling said apertures to interlock the said inner and outer members without substantial chemical bonding of the ductile cast iron of the outer member to the steel of the inner member.

9. The composite brake spider of claim 4 wherein each of said apertures is elongated in the circumferential dimension of said circular hub.

10. The composite brake spider of claim 9 wherein each of the apertures has opposed ends and wherein said apertures are radially tapered inwardly of said circular hub.

11. The composite brake spider of claim 1 in which said surface irregularity of said inner member is an aperture extending through said inner member.

12. A method of forming a composite brake spider adapted for welding attachment to an axle comprising the steps of:
    forming a pair of elongated steel plates;
    forming at least one aperture through each of said steel plates;
    bending each of the steel plates into a part-circular shape along its length,
    joining the two part-circular shapes end to end to form a circular hub member,
    placing the hub member as a core in a mold for a brake spider casting, and
    filling the mold and apertures of said hub member with ductile cast iron to form a composite cast iron and steel brake spider having a hub that is weldable to said axle in a fixed, operating position without substantial chemical bonding of the ductile cast iron to the steel of the hub.

13. The method of claim 12 in which each of said steel plates includes a plurality of apertures.

14. The method of claim 13 in which the plurality of apertures consists of two apertures in each of said plates.

15. The method of claim 12 in which the apertures have apposed ends, and in which the steel plates are formed to semi-circular shape such that the apertures therethrough taper inwardly at their ends.

16. The method of forming a composite brake spider adapted for welding attachment to an axle comprising the steps of:
    forming a hollow circular band of steel adapted to encircle said axle, said band having a wall and an outer surface,
    providing at least one surface irregularity in the outer surface of the wall of said hollow circular band,
    placing the hollow circular band of steel as a core in a casting mold for a brake spider, and
    filling the casting mold with ductile cast iron to form a composite cast iron and steel brake spider in which the cast iron fills said surface irregularity of said steel circular band interlocking the cast iron part to the steel part as a composite brake spider without substantial chemical bonding of said ductile cast iron to the steel of said hollow circular band, said hollow circular band part being adapted to fit around said axle and being weldable thereto.

17. The method of claim 16 in which the hollow circular band includes a plurality of apertures equally spaced apart circumferentially about the said circular band.

18. The method of claim 17 wherein said apertures have applied ends and are elongated in the circumferential dimension of said circular band, and wherein the ends of each of said apertures taper radially inwardly.

19. The method of claim 16 wherein the circular band of steel is formed by forging without any seam in its circumference, and wherein said at least one surface irregularity receives at least one, radially outwardly projecting rib in an outer surface of said forging.

20. The method of claim 19 wherein said at least one radially outwardly projecting rib comprises a plurality of circumferentially spaced apart, outwardly projecting ribs in the outer surface of said forging.

* * * * *